(12) United States Patent  
Pockrandt

(10) Patent No.: US 9,484,119 B2  
(45) Date of Patent: Nov. 1, 2016

(54) LIQUID NITROGEN EMERGENCY COOLING SYSTEM FOR NUCLEAR POWER PLANTS

(71) Applicant: Scott Clair Pockrandt, Ridgecrest, CA (US)

(72) Inventor: Scott Clair Pockrandt, Ridgecrest, CA (US)

(*) Notice: Subject to any disclaimer, the term of this patent is extended or adjusted under 35 U.S.C. 154(b) by 42 days.

(21) Appl. No.: 14/817,669

(22) Filed: Aug. 4, 2015

(65) Prior Publication Data

US 2015/0380115 A1 Dec. 31, 2015

(51) Int. Cl.
*G21C 15/18* (2006.01)
*G21C 15/28* (2006.01)
*G21C 9/004* (2006.01)

(52) U.S. Cl.
CPC ............... *G21C 15/18* (2013.01); *G21C 15/28* (2013.01); *G21C 9/004* (2013.01); *Y02E 30/40* (2013.01)

(58) Field of Classification Search
CPC .. G21C 15/18; G21C 15/182; G21C 15/185; G21C 15/187
USPC .................................................. 376/282, 299
See application file for complete search history.

(56) References Cited

U.S. PATENT DOCUMENTS

| 3,508,090 A * | 4/1970 | Crampton | B01D 53/26 310/11 |
| 3,900,366 A * | 8/1975 | Sakaguchi | G21C 15/18 376/282 |
| 3,968,653 A * | 7/1976 | Cachera | G21C 15/18 376/298 |
| 2012/0002776 A1* | 1/2012 | DuBrucq | F42B 33/06 376/384 |
| 2013/0044851 A1* | 2/2013 | Winters | G21C 15/182 376/299 |
| 2013/0108004 A1* | 5/2013 | Lee | G21C 15/24 376/299 |
| 2014/0105348 A1* | 4/2014 | Lin-Hendel | G21C 15/18 376/282 |

FOREIGN PATENT DOCUMENTS

DE 3100716 A1 * 8/1982

* cited by examiner

*Primary Examiner* — Jack W Keith
*Assistant Examiner* — Daniel Wasil
(74) *Attorney, Agent, or Firm* — Garrett James O'Sullivan; Timothy Marc Shropshire; Eric Brandon Lovell

(57) ABSTRACT

A reactor cooling system for cooling a nuclear reactor using nitrogen comprising a refrigeration unit for cooling and compressing nitrogen gas into liquid nitrogen, a liquids storage tank to store liquid nitrogen, the tank in fluid communication with the refrigeration unit, a heat exchanger drop system in fluid communication with the liquids storage tank, adjacent to the nuclear reactor, wherein the nitrogen absorbs heat by becoming gaseous, a tank for receiving and holding nitrogen gas in fluid communication with the heat exchanger and in fluid communication with the refrigeration unit, and where the system is a closed-loop drop system.

10 Claims, 2 Drawing Sheets

LIQUID NITROGEN EMERGENCY COOLING SYSTEM FOR NUCLEAR POWER PLANTS

FIELD OF THE INVENTION

This invention relates to a reactor cooling system for cooling a nuclear reactor using nitrogen in a closed-loop system.

BACKGROUND

Current emergency cooling systems rely heavily on a mass storage of water, and a comparatively small temperature difference for cooling. Further, current systems are large scale and massive in size, and rely on generated power, gravity feed and/or pressurized systems and manual activation of several components to secure the shutdown of a nuclear plant in the event of natural disaster, damage or attack, etc.

Therefore, there is a need for emergency cooling system that can be activated automatically, and passively, to immediately, by means of the application of liquid Nitrogen in a closed loop system, cool overheated equipment to a safe working temperature. Further, there is a need for an emergency cooling system that eliminates the production of Hydrogen or other hazardous gases caused by the overheating of equipment, and the subsequent danger of explosion, by using liquid Nitrogen in a closed loop system. Further, there is also a need for a system that provides for a differential of over a greater range from coolant to "boil off" temperatures, providing a more efficiency in cooling, while producing no explosive gasses (such as hydrogen, etc.) which can be produced by current cooling systems.

SUMMARY OF THE INVENTION

In the present invention a reactor cooling system for cooling a nuclear reactor using nitrogen is presented comprising a refrigeration unit for cooling and compressing nitrogen gas into liquid nitrogen, a liquids storage tank to store liquid nitrogen, the tank in fluid communication with the refrigeration unit, a heat exchanger drop system in fluid communication with the liquids storage tank, adjacent to the nuclear reactor, wherein the nitrogen absorbs heat by becoming gaseous, a tank for receiving and holding nitrogen gas in fluid communication with the heat exchanger and in fluid communication with the refrigeration unit; and wherein the system is a closed-loop system.

In an embodiment of the invention, the system includes a gas-powered generating unit, for generating electricity from the nitrogen gas as it expands.

In another embodiment, the system further includes a hydraulic system for using the power of the expanding gas from an outlet of the heat exchanger drop. In this embodiment, the hydraulic system can either be used to restart the nuclear power plant or to provide hydraulic power. Moreover, the hydraulic system opens and shuts valves as needed for the safe continued operation of under normal circumstances, in the event of a near failure, and for emergency shut down.

In yet another embodiment, the system can include an overpressure relief valve system for bypassing the refrigeration unit.

In yet another embodiment, the system can include a relief valve to relieve excess pressure in the system. In an embodiment, the relief valve may be evacuated to an expansion tank.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

In its current form, the system will utilize current "waste energy" and/or engineered energy, produced by an electrical generation plant to continuously collect, condense, cool, store and recycle nitrogen gas ($N_2$) from the atmosphere for use in the system. The waste energy is that energy which is normally produced as a stand-by amount, and which must be continually produced "in case" a demand is placed on the power grid. This is an unavoidable energy, which represents drag, and therefore loss, on the generation system, without being used for practical purposes.

The $N_2$ is extracted from the atmosphere by a separation system, which is already widely available. The $N_2$ is compressed to pressure, and cooled to liquid, and then stored in liquid form for use in the system, which is passively activated. Part of the $N_2$ is continuously cycled to produce electricity for on-site usage, and to recharge an electrical storage unit. This $N_2$ is recovered in a closed system.

Once activated, the liquid $N_2$ that is stored is applied to cool overheated equipment, and is recovered in an "operating pressure" safety system, which is more efficient than current systems which merely exhaust the containment heat by water cooling through heat exchange. Operating pressure, is a low pressure system used to recycle the $N_2$ back to the liquefaction unit to be reused in the system.

$N_2$ is a natural component of the atmosphere, comprising approximately 80% of the air, non-reactive and is non-explosive. The $N_2$ will, upon expansion be held in a closed low, medium or high-pressure system. Even if that closed system were to be breached, the $N_2$ would be released at atmospheric pressure with no pollution generated.

Finally, $N_2$ is safe to use in the system, and even if exposed to nuclear material, it has no long-lasting residual effects, and does not pose any significant danger to people, soil, air, animals or plants. There are no long-lasing radioactive isotopes which would result in contamination or pose health risks. Natural Nitrogen (N) consists of two stable isotopes, 14N, which makes up the vast majority of naturally occurring nitrogen, and 15N. Fourteen radioactive isotopes have also been identified, with atomic masses ranging from 10N to 25N, and 1 nuclear isomer, 11 mN. All are short-lived, the longest-lived being 13N with a half-life of 9.965 minutes. All others have half-lives under 7.15 seconds, with most under five-eighths of a second. Most of the isotopes with mass below 14 decay to isotopes of carbon, while most of the isotopes with mass above 15 decay to isotopes of oxygen. The shortest-lived isotope is 10N, with a half-life of 2.3 MeV. (Source available.)

Figure 1:
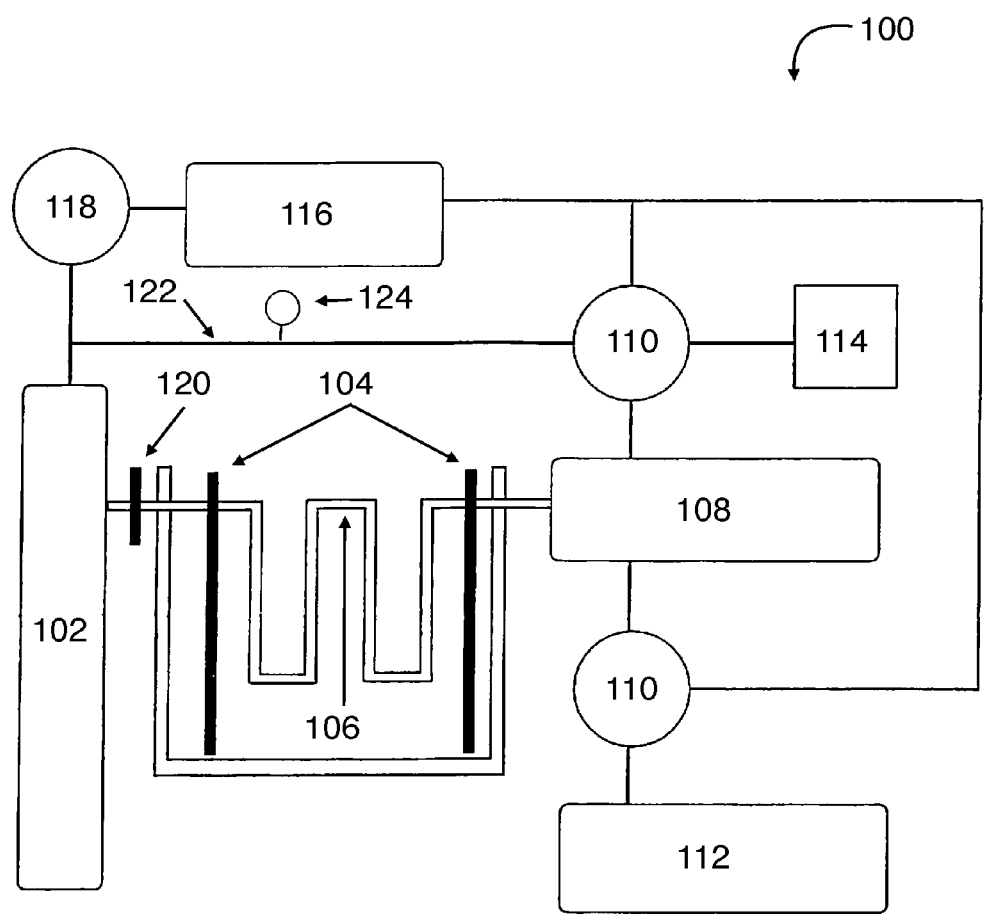
FIG. 1 shows the operation of the Liquid Nitrogen Emergency Cooling System for Nuclear Power Plants, according to an embodiment of the present invention.

FIG. 1 shows the operation of the Liquid Nitrogen Emergency Cooling System for Nuclear Power Plants, designated generally as 100, according to an embodiment of the present invention.

Atmospheric nitrogen ($N_2$), which exists naturally as a diatomic molecule (i.e., a 2 atom molecule) in a gaseous state, is filtered from the atmosphere, compressed and cooled to a liquid state using readily available equipment, for example the cooler compressor refrigeration unit 118.

The liquefied gas is delivered to the liquid $N_2$ storage tank 102. Storage tank 102 operates as a buffer or bellows, storing a sufficient amount of liquid nitrogen to provide cooling when necessary.

Under non-emergency operation conditions, the liquid nitrogen continuously expands within the storage tank 102 and is diverted by means of a liquid $N_2$ boil-off overpressure line 122, which is fitted with an overpressure relief valve system 124, to a $N_2$ gas powered generating unit 110, which generates electrical and/or hydraulic power, which is used to power a cooling, compressor, refrigeration unit 118, making the closed-loop operation efficient.

Under non-emergency operation conditions, the "spent" gaseous $N_2$, from $N_2$ gas powered generating unit 110 is cycled back to cooling, compressor, refrigeration unit 118, through a loop including a accumulator tank for $N_2$ gas 116, which increases efficiency by reducing the amount of atmospheric filtering required by cooling, compressor, refrigeration unit 118 to deliver liquid nitrogen ($N_2$) to liquid $N_2$ storage tank 102. In addition, the $N_2$ can be used to decontaminate equipment on site without removal of said equipment.

Under non-emergency operation conditions, $N_2$ gas powered generating unit 110 also supplies electrical energy to an electrical energy storage system 114 for use during emergency operation conditions.

In an embodiment, under non-emergency operation conditions, $N_2$ gas powered generating unit 110 also supplies electrical energy to a hydraulic system 112 for use during emergency operation conditions (e.g., to operate valves, and other equipment independently of electrical mechanisms). This assists to keep hydraulic psi of the $N_2$ at a workable state when at rest.

Under emergency operation conditions, an activation mechanism 120 operates in a "fail-safe" manner, automatically applying liquid nitrogen to a heat exchanger-drop system 106. When the heat in the reactor rises above a pre-determined threshold, the nitrogen cooling system is descended into the reactor by the drop system.

Figure 2A:
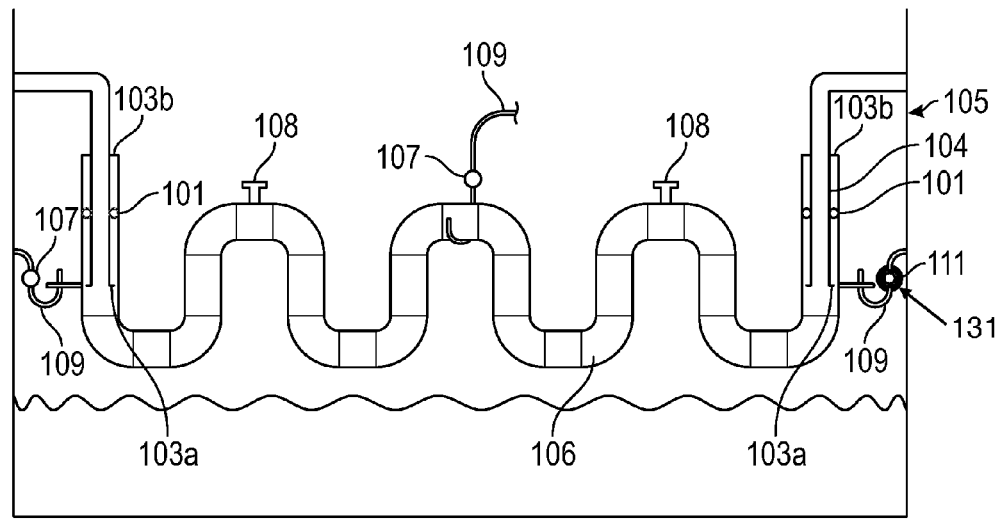
FIG. 2A shows the emergency drop system for the system's heat exchanger, according to an embodiment of the present invention.
Figure 2B:
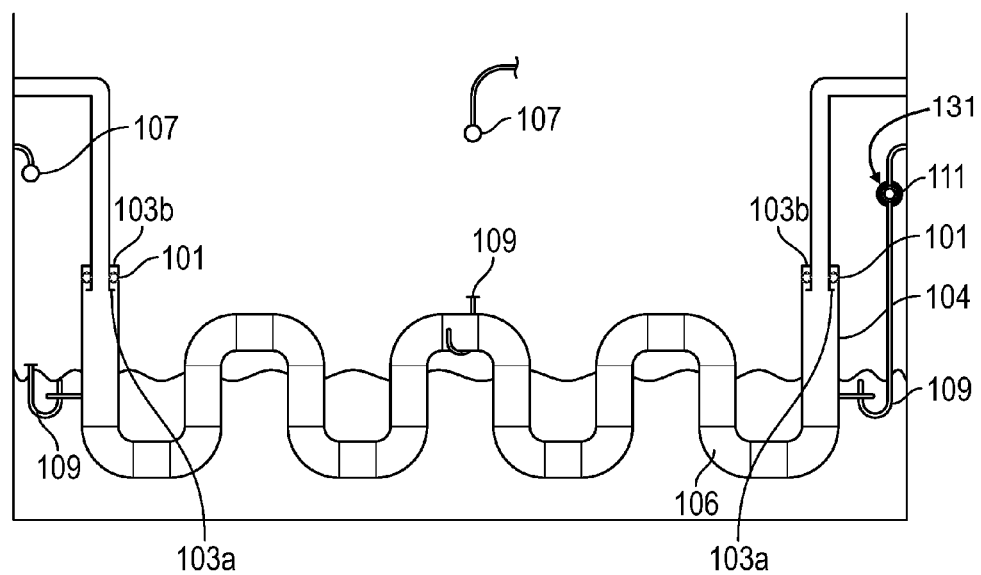
FIG. 2B shows the emergency drop system for the system's heat exchanger, according to an embodiment of the present invention.

With further reference to FIGS. 2A and 2B, under emergency operation conditions, an emergency drop system 105 is triggered to bring heat exchanger 106 into proper position to cause cooling of the nuclear power plant. The drop system operates with one or more nested sections of piping 104 on either side of the heat exchanger 106. As the heat exchanger 106 lowers, the piping 104 expands such that the lip 103 of the inner pipe catches against the narrowing 103b of the outer pipe. This may be extended to several pipes 104 in a telescopic fashion, and O-rings or gaskets are present wherever the pipes 104 extend and the lips 103a meet the narrowing 103b, to seal the joints. The piping is held in place by mounts 109 connected to the structure by heat activated fusible links 107 or by other, computer-controlled mechanisms that operate by excessive heat. Once the heat fusible links 107 heat up enough to collapse and release the piping 104, the piping 104 extends downwardly to lower the heat exchanger 106 into the reactor. In an alternative embodiment, the heat causes the $N_2$ to boil and differential pressure causes a burst disc (rupture disc) 108 to open, pushing the drop system and pipe 104 rapidly downward to minimize loss of the $N_2$ through the pipe junctions. The burst disc 108 is designed to burst at a precise differential pressure to release $N_2$ as required to achieve cooling as needed, depending on the size of the system. The piping seals once the system has dropped into the reactor and prevents the escape of $N_2$ gas. In an embodiment, the dropped heat exchanger 106 is held in place by a locking mechanism 111 having a counterweight 131 holding the dropped pipe in place, with facility to raise the heat exchanger 106 when it is no longer needed.

In order to reduce pipe hammer from liquefied $N_2$ in the pipes, the pipes may contain a heat exchanger which enables the $N_2$ to be converted into a gaseous form, reducing pipe hammer. Alternatively, the pipes may be made thicker and stronger to withstand pipe hammer.

Liquid nitrogen from liquid $N_2$ storage tank 102 flows through heat exchanger-drop system 106 and removes heat by becoming gaseous. The expanded, gaseous nitrogen from exhaust of $N_2$ gas 108, which acts as a receiver for gaseous $N_2$, is delivered to the $N_2$ gas powered generating unit 110 to supply both electrical and hydraulic power.

In an embodiment, stored power, held in hydraulic system 112 and electrical energy storage system 114 is used to restart the nuclear power plant.

During emergency operation conditions, the "spent" gaseous $N_2$, from $N_2$ gas powered generating unit 110 is cycled back to cooling, compressor, refrigeration unit 118, through a loop including accumulator tank for $N_2$ gas 116, which allows system 100 to be recharged in real time for continuous operation in cooling the nuclear power plant. The condensers may in effect be used as a battery pack.

Under all conditions, in the event of overpressure of system 100, nitrogen gas is released into the atmosphere by means of overpressure relief valve system 124 after it is vented to an evacuated expansion tank.

System 100 is efficient, affordable and readily available to retrofit to existing nuclear power generation plants, and can be incorporated into new facilities. System 100 is needed to accomplish the automatic operation and safe application of liquid $N_2$ coolant, extraction and storage of liquid $N_2$ for use as coolant, and the recapture system for the $N_2$, and the reduction of radiation danger potential.

Regarding applications, in addition to large-scale nuclear generation units, system 100 can be applied to other systems, for example: (1) Small-scale applications for nuclear generation units—further research will be needed to determine how the system can best be adapted for use in small-scale nuclear generators; (2) Small-scale application for portable nuclear generation units—further research will be conducted to determine how the system can best be adapted for use in small-scale nuclear generators on board aircraft, shipping, spacecraft, rural and residential applications; and (3) heavy and light manufacturing process power supply configurations—further research will be conducted to determine how the system can best be adapted for use in small-scale, medium-scale and large-scale applications suited for power-grid-independent nuclear generators, which can operate in as stand-alone configuration for such operations. With all of these applications in mind, system 100 achieves the basic goal of providing safety for emergency shut down and cooling of power generation plants.

I claim:

1. A drop system for cooling a nuclear reactor, the drop system comprising:
   a. a heat exchanger having a first side and a second side, wherein the heat exchanger is within a nuclear reactor, the heat exchanger comprising:
      i. an inner pipe having an expandable lip, wherein one or more gaskets are circumferencially engaged with an outer circumference of the inner pipe;
      ii. an outer pipe, wherein the inner pipe and the outer pipe are nested, wherein a first end of the nested inner and outer pipes is in communication with the first side of the heat exchanger, wherein a second end of the nested inner and outer piper is in communication with the second side of the heat exchanger, wherein the inner pipe slidingly engages an interior surface of the outer pipe;
      iii. one or more burst discs, wherein the one or more burst discs are configured to rupture;
   b. one or more fusible links attached to the outer pipe, wherein the fusible links are collapsible, wherein the one or more fusible links are heat activated;
   c. at least one locking mechanism having a counter weight,
   wherein the at least one locking mechanism is in communication with the outer pipe,
   wherein the locking mechanism raises and lowers the outer pipe, and wherein liquid nitrogen absorbs heat as it flows through the heat exchanger, and wherein the liquid nitrogen flows through the heat exchanger after the one or more burst discs rupture.

2. The system of claim 1, further comprising a gas-powered generating unit, for generating electricity from the liquid nitrogen gas as it expands.

3. The system of claim 2, further comprising a hydraulic system powered by the gas-powered generating unit.

4. The system of claim 3, wherein hydraulic system opens and shuts valves.

5. The system of claim 1, comprising a relief valve to relieve excess gaseous nitrogen pressure from the system.

6. The system of claim 5, further comprising an expansion tank, wherein the relief valve evacuates the excess gaseous nitrogen pressure to the expansion tank.

7. The system of claim 1, wherein the fusible links collapse at a predetermined temperature, and wherein the collapsing of the links cause the heat exchanger to automatically drop into a position at a lowered state relative to an elevated state.

8. The system of claim 1, wherein the several pipes communicate the liquid nitrogen through the first side of the heat exchanger.

9. The system of claim 1, wherein the liquid nitrogen comprises compressed atmospheric nitrogen.

10. The system of claim 1, further comprising a hydraulic system in communication with the heat exchanger.

* * * * *